United States Patent
Kwitek

(10) Patent No.: US 10,813,363 B2
(45) Date of Patent: Oct. 27, 2020

(54) PORTABLE CINNAMON ROLL AND METHOD FOR MAKING

(71) Applicant: GELLYFISH TECHNOLOGY OF TEXAS, LLC, Marshall, TX (US)

(72) Inventor: Benjamin J Kwitek, Canon City, CO (US)

(*) Notice: Subject to any disclaimer, the term of this patent is extended or adjusted under 35 U.S.C. 154(b) by 0 days.

(21) Appl. No.: 15/176,793

(22) Filed: Jun. 8, 2016

(65) Prior Publication Data

US 2016/0353753 A1 Dec. 8, 2016

Related U.S. Application Data

(60) Continuation of application No. 13/251,758, filed on Oct. 3, 2011, now abandoned, which is a division of application No. 11/249,666, filed on Oct. 14, 2005, now Pat. No. 7,608,790.

(60) Provisional application No. 60/618,133, filed on Oct. 14, 2004.

(51) Int. Cl.
*A21D 13/31* (2017.01)
*A21D 15/02* (2006.01)

(52) U.S. Cl.
CPC ............ *A21D 13/31* (2017.01); *A21D 15/02* (2013.01)

(58) Field of Classification Search
None
See application file for complete search history.

(56) References Cited

U.S. PATENT DOCUMENTS

| 4,882,185 A | 11/1989 | Simelunas et al. |
| 5,433,447 A | 7/1995 | Pocklington |
| 5,514,395 A | 5/1996 | Burger |
| 5,654,021 A | 8/1997 | Burger |
| 6,054,698 A | 4/2000 | Mast |
| 6,280,782 B1 | 8/2001 | Hahn et al. |
| 6,589,583 B1 | 7/2003 | Hansen et al. |
| 6,616,960 B2 | 9/2003 | Peterson et al. |
| 2002/0068115 A1 | 6/2002 | Hayes-Jacobson |
| 2003/0165605 A1 | 9/2003 | Brown et al. |
| 2004/0096548 A1 | 5/2004 | Stevens et al. |

FOREIGN PATENT DOCUMENTS

EP 0547551 A1 6/1993

OTHER PUBLICATIONS

"Lemon-Poppy Seed Doughnut Holes". Available online from myrecipes.com from Sunset, as of May 2003. pp. 1-2.
Definition of "doughnut". Retrieved online from thefreedictionary.com Jan. 31, 2013. p. 1.
Parrish. "The pan where East meets West". Available online Aug. 2, 2001 from old.post-gazette.com. pp. 1-3.
Joy of Baking.com, "Frosting or Icing". Available online Aug. 1, 2003. pp. 1-3.
Diana's Desserts—Danish Aebleskiver. Available online Aug. 23, 2003 from www.dianasdesserts.com. pp. 1-3.
"Ball Diameter". Available online Mar. 6, 2003 from leaderboard.com. p. 1.

*Primary Examiner* — Jenna A Watts
(74) *Attorney, Agent, or Firm* — Law Office of Scott C Harris, Inc

(57) ABSTRACT

A method for manufacturing a portable cinnamon roll includes forming raw dough in the shape of a sphere having a central pocket, placing cinnamon, frosting and sugar within the central pocket and cooking the raw dough with cinnamon, frosting and sugar until it is fully prepared for consumption.

5 Claims, 3 Drawing Sheets

PORTABLE CINNAMON ROLL AND METHOD FOR MAKING

CROSS REFERENCE TO RELATED APPLICATION

This application is base upon U.S. Provisional Patent Application Ser. No. 60/618,133, entitled "PORTABLE CINNAMON ROLL AND METHOD FOR MAKING", filed Oct. 14, 2004.

BACKGROUND OF THE INVENTION

1. Field of the Invention

The invention relates to a food product. More particularly, the invention relates to a portable cinnamon roll wherein the cinnamon, frosting, sugar and other ingredients are contained within a central pocket formed in the dough of the cinnamon roll.

2. Background of the Invention

Many people love cinnamon rolls. They are delicious and many people consider them to be addictive. As their popularity has grown, shops specializing in cinnamon rolls have been built throughout the country. Many of these shops now exist in airports, shopping malls, roadside rest stops and other locations. In fact, cinnamon rolls have become an "on the go" treat consumed by people moving from one point to another. Many food companies have also introduced products that incorporate cinnamon or cinnamon roll flavors. These include cereals, breads, cookies and other packaged products.

There are, however, a few notable problems with cinnamon rolls as they are currently manufactured and sold. First, cinnamon rolls are generally rather large. When purchased at stores, consumers are often forced to buy the cinnamon rolls in a package of four, six, eight or more large rolls. When served in restaurants or food courts, substantial cinnamon rolls are often served on a plate or in a box.

Their considerable size and decadent ingredients oftentimes make people uncomfortable. Consequently, cinnamon rolls are generally not a light snack option for people watching their diets, although many people might want a small taste of a cinnamon roll without the need for purchasing and eating a complete cinnamon roll.

In addition, current cinnamon rolls are quite messy. The combination of warm dough, sugar, cinnamon and frosting makes eating them difficult. Eating is especially difficult when people are on the go. The ingredients tend to get on the hands, face and even clothing of the consumer. This may be embarrassing for some people and cause frustration for parents of children eating cinnamon rolls in a messy manner.

Further, cinnamon rolls are not easy to make at home. The process is complicated and time consuming. The dough must be made first and the ingredients are then rolled within a dough substrate. Finally, the assembled cinnamon roll must be baked and coated with frosting. Brownies, cookies and even donuts are easier to make than cinnamon rolls.

With the foregoing in mind, an improved process for making and distributing cinnamon rolls is needed. The present invention provides such a process for manufacturing and method for distribution.

SUMMARY OF THE INVENTION

It is, therefore, an object of the present invention to provide a method for manufacturing a portable cinnamon roll. The method includes forming raw dough in a predetermined shape having a central pocket, placing cinnamon, frosting and sugar within the central pocket and cooking the raw dough with cinnamon, frosting and sugar until it is fully prepared for consumption.

It is also an object of the present invention to provide a method wherein the raw dough is formed in the shape of a sphere and has a diameter of approximately 0.5 inches to approximately 2.5 inches.

It is another object of the present invention to provide a method wherein the central pocket has a diameter of approximately 0.12 inches to approximately 1.5 inches.

It is a further object of the present invention to provide a method wherein the central pocket is isolated from the exterior surface of the portable cinnamon roll.

It is also another object of the present invention to provide a method including the step of freezing the portable cinnamon roll after the step of cooking.

It is also a further object of the present invention to provide a method wherein the step of placing includes injecting the cinnamon, frosting and sugar within the central cavity.

It is still another object of the present invention to provide a method including the step of placing the portable cinnamon rolls within a bag.

It is yet a further object of the present invention to provide a method wherein the bag is a microwave safe bag.

It is also an object of the present invention to provide a portable cinnamon roll manufactured in accordance with the method described above.

It is another object of the present invention to provide a portable cinnamon roll including a dough sphere of approximately 0.5 inches to approximately 2.5 inches in diameter, the dough sphere including a central pocket containing cinnamon, frosting and sugar.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 3a through 3e present a schematic of the present process for the manufacture of portable cinnamon rolls, wherein FIG. 3a shows the unfilled dough sphere with a central pocket therein, FIG. 3b shows filling of the unfilled dough sphere, FIG. 3c shows cooking of the cinnamon rolls, FIG. 3d shows freezing or refrigerating of the cinnamon rolls and FIG. 3e shows the packaged cinnamon rolls.

DESCRIPTION OF THE PREFERRED EMBODIMENTS

Figure 1:
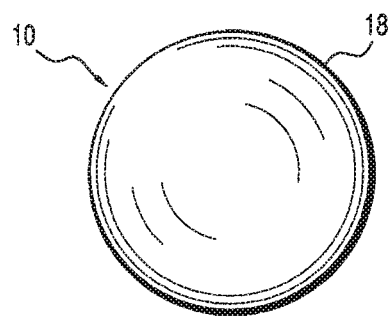
FIG. 1 is a perspective view of a portable cinnamon roll in accordance with the present invention.
Figure 2:
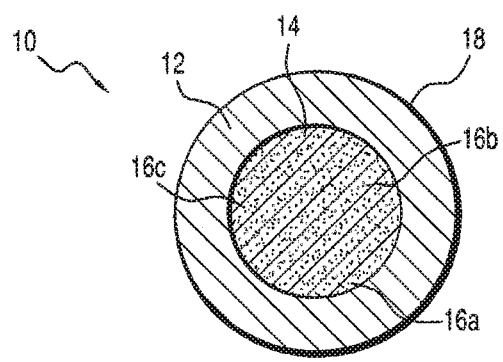
FIG. 2 is a cross sectional view of a cinnamon roll in accordance with the present invention.
Figure 3A:
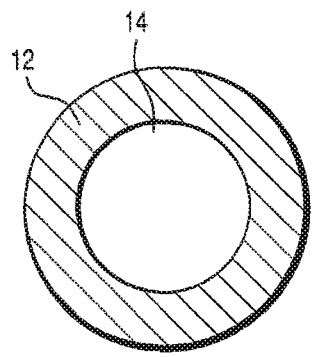
Figure 3B:
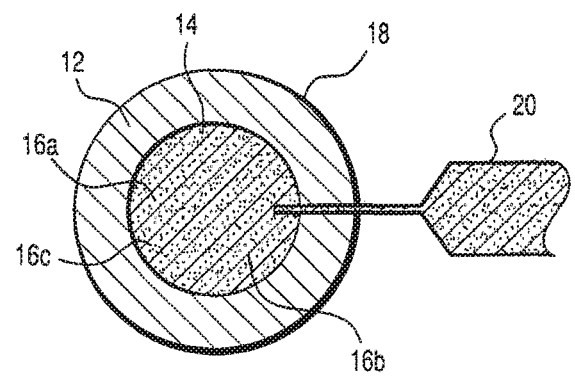
Figure 3C:
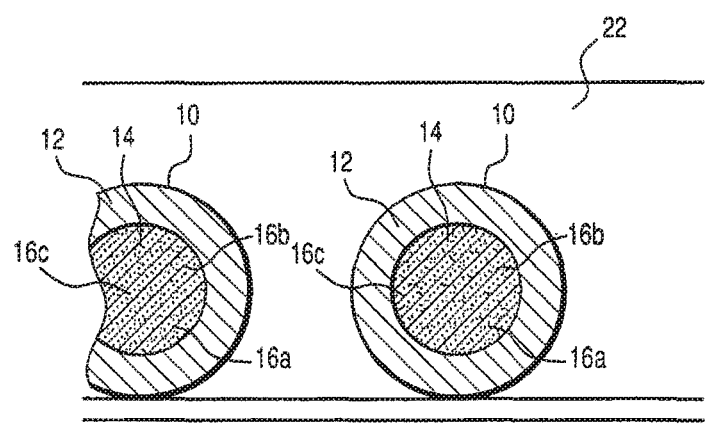
Figure 3D:
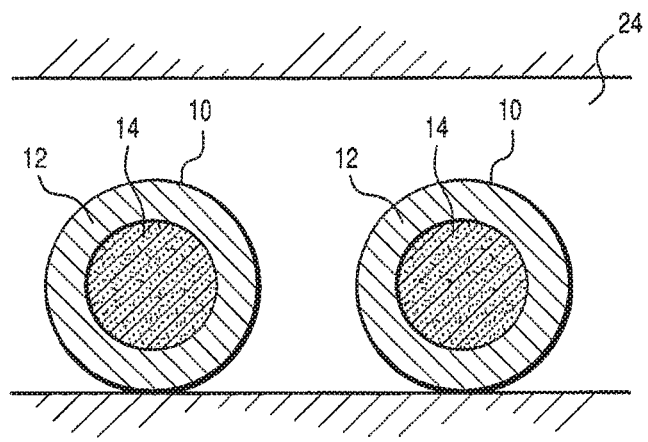
Figure 3E:
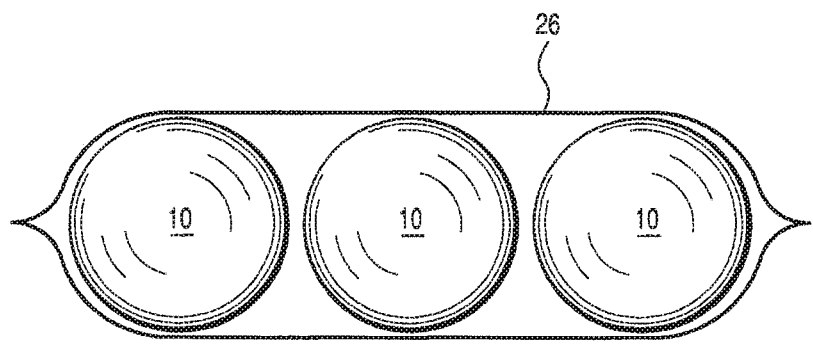

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to the various figures, a method for manufacturing and distributing portable cinnamon rolls 10 is disclosed. As will be discussed below in greater detail, the manufacturing process generally includes forming raw dough 12 into a bite-size shape, such as, a small sphere, having a central pocket 14, placing cinnamon, frosting and sugar 16*a*, 16*b*, 16*c* within the central pocket 14 and cooking the raw dough 12 with cinnamon, frosting and sugar 16*a*, 16*b*, 16*c* until the cinnamon roll is fully prepared for consumption.

Briefly, the portable cinnamon rolls 10 are created in the form of small balls in accordance with a preferred embodiment of the present invention. Preferably, the small spheres are approximately 0.5 inches to approximately 2.5 inches in diameter. Other geometric shapes may also be created. In addition, the portable rolls may be specially formed into the shapes of animals, characters and various other objects. Some of these shapes may be popular with children. Each portable cinnamon roll 10 is made from dough 12 similar to that used in traditional cinnamon rolls. As discussed below in greater detail, the dough 12 includes a central pocket 14 containing the common ingredients utilized in conjunction with cinnamon rolls, that is, cinnamon, frosting and sugar 16*a*, 16*b*, 16*c*.

The dough utilized in accordance with a preferred embodiment of the invention is the same as that commonly utilized in conjunction with conventional cinnamon rolls. The dough may be modified in such a way that it can be frozen or refrigerated without losing its positive characteristics. In addition, the dough should be edible when either cold or warm.

Within each dough sphere 12 is a spherical, central pocket 14 having a diameter of approximately 0.12 inches to approximately 1.5 inches. The central pocket 14 is filled with frosting or cream 16*b* commonly used on the outside of current cinnamon rolls. Cinnamon 16*a*, sugar 16*c* and other ingredients are further forced within the central pocket 14 such that they mix with the frosting or cream 16*b*. As those skilled in the art of food manufacture will appreciate, the central pocket 14 may be formed through extrusion, co-extrusion, injection processes, centrifugal or centripetal mixing or other methods.

The central pocket 14 is isolated from the exterior surface 18 of the portable cinnamon roll 10 and consumers are not aware of the filling when inspecting the exterior surface 18 of the portable cinnamon roll 10. In fact, the exterior surface 18 of the portable cinnamon roll 10 in accordance with the present invention would appear quite clean, with the sweet and sticky frosting 16*b* fully contained within the internal central pocket 14. This frosting 16*b* is only revealed and tasted once the person bites into the portable cinnamon roll 10.

In accordance with a preferred embodiment of the present invention, the filling (that is, the frosting, cinnamon, sugar and other ingredients) is injected (or co-extruded) within the central pocket 16 during manufacturing. As those skilled in the manufacture of food products will certainly appreciate, a wide variety of injection tools 20 are available for the injection of food products, and it is contemplated these may be used in accordance with the present invention. It is also contemplated the central pocket may contain a separate sphere or shape containing the frosting and other ingredients. This sphere could be constructed from a gelatinous capsule material or other product that does not affect the final taste of the present cinnamon roll. However, those skilled in the art will understand other ways in which the frosting 16*b*, sugar 16*c* and cinnamon 16*a* may be incorporated within the central pocket 14 during formation of the portable cinnamon roll 10 without departing from the spirit of the invention.

Once the raw dough 12 is formed and the frosting 16*b*, cinnamon 16*a*, sugar 16*c* and other ingredients are injected within the central pocket 14, the portable cinnamon rolls 10 are fully baked and/or processed, or otherwise cooked, during production and prior to distribution. As those skilled in the art will certainly appreciate, there are numerous ways in which the portable cinnamon rolls 10 may be baked and/or processed, for example, within a conveyor type oven 22. Once baked and/or processed, the portable cinnamon rolls 10 may be frozen or refrigerated 24, boxed or packaged 26 and prepared for distribution. Although a conveyor type oven is disclosed in accordance with a preferred embodiment, other cooking processes may be employed without departing from the spirit of the present invention.

In accordance with a preferred embodiment, the portable cinnamon rolls 10 are packed and sealed within small bags 26, for example, filled with two to twelve of the portable cinnamon rolls 10 within each bag 26.

As the portable cinnamon rolls 10 are pre-baked and ready for eating, individual portable cinnamon rolls 10 or an entire bag 26 of portable cinnamon rolls 10, may be placed within a lunch box or other carrying case. If packaged as a frozen food, the portable cinnamon rolls may be distributed to a lunch box or other carrying case while still frozen. The portable cinnamon rolls 10 are then thawed and warmed during the next few hours and may be eaten later without a heating device, such as, an oven, heat lamp or microwave.

It is further contemplated that the portable cinnamon rolls 10 may also be microwaved prior to eating. As such, the portable cinnamon rolls 10 may be packaged within microwave safe bags 26 and may be heated so as to provide warm cinnamon roll flavor in the form of a convenient and easy to eat cinnamon roll.

The convenience of delicious and prepackaged portable cinnamon rolls in accordance with the present invention provides users with the opportunity to enjoy cinnamon rolls anytime without worrying they may be eating too much or that the cinnamon rolls will create a mess. The small size and packaging makes the products easy for consumers to purchase and eat. In addition, the small packages may be sold in many places, including grocery and convenience stores, cinnamon roll stores, cafeterias, donut or coffee shops and/or even fast food restaurants.

While this invention specifically relates to portable cinnamon rolls, it is possible the concepts underlying the present invention could apply to other pastry and bread products. The combination of an easy to prepare, handle and eat bite-size shape with a filled center is a great way to incorporate two elements such as, dough and frosting, fruit, cream, spreads and other products.

While various preferred embodiments have been shown and described, it will be understood that there is no intent to limit the invention by such disclosure, but rather, is intended to cover all modifications and alternate constructions falling within the spirit and scope of the invention.

The invention claimed is:

1. A portable cinnamon roll, comprising:
    a section of dough, formed into a generally spherical shape, having an outer surface and a central pocket inside the outer surface and not exposed to the outer surface,
    said outer surface being of approximately 0.5 inches to approximately 2.5 inches in diameter,
    the central pocket including a different material than the outer surface,
    wherein the central pocket is isolated from the outer surface of the portable cinnamon roll, the central pocket having an encapsulated portion inside said central pocket with said different material therein, said different material formed of cinnamon, frosting and sugar, wherein the outer surface does not have said cinnamon, frosting and sugar.

2. A portable cinnamon roll, comprising:

a dough shape composed of dough, the dough shape being between 0.5 inches and 2.5 inches across, the dough shape including an outer surface, and a central pocket isolated from said outer surface, where the outer surface is a material that is not sticky, and the central pocket includes a sticky cinnamon roll frosting, that is isolated from the outer surface, and where there is dough material having a specified thickness forming an area between said central pocket and said outer surface, and where the central pocket is filled with an encapsulated cinnamon roll material ingredient, wherein the encapsulated cinnamon roll material ingredient includes the sticky cinnamon roll frosting.

3. A portable cinnamon roll, comprising:

a dough shape composed of dough, the dough shape being between 0.5 inches and 2.5 inches across, the dough shape including an outer surface, and a central pocket isolated from said outer surface, where the outer surface is a material that is not sticky, and the central pocket includes a sticky cinnamon roll frosting, that is isolated from the outer surface, wherein the dough shape is a sphere, said central pocket contains a sphere containing the sticky cinnamon roll frosting.

4. The portable cinnamon roll according to claim 3, wherein the sphere is constructed from a gelatinous material that does not affect taste of the cinnamon roll.

5. A cinnamon roll, comprising:

a dough shape composed of dough, the dough shape being between 0.5 inches and 2.5 inches from end to end, the dough shape including a central pocket isolated from an outer surface, A the outer surface formed of a material that is not sticky, the central pocket formed of a sticky material including cinnamon roll ingredients, wherein said central pocket includes a pocket having a defined surface forming a defined shape, where there is dough material having a specified thickness forming an area between said central pocket and said outer surface, and a gelatinous capsule material, forming a shape that fits within said central pocket, said gelatinous capsule material covering cinnamon roll ingredients including at least frosting and cinnamon for the cinnamon roll, said gelatinous capsule material being a product that does not affect taste of the cinnamon roll.

* * * * *